US011549805B2

(12) United States Patent
Gan et al.

(10) Patent No.: US 11,549,805 B2
(45) Date of Patent: Jan. 10, 2023

(54) PROJECTING APPARATUS AND PROJECTING CALIBRATION METHOD

(71) Applicant: Industrial Technology Research Institute, Hsinchu (TW)

(72) Inventors: Kai-Shiang Gan, Tainan (TW);
Po-Lung Chen, Tainan (TW);
Chun-Yuan Chen, Tainan (TW);
Chien-Chun Kuo, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 329 days.

(21) Appl. No.: 16/828,902

(22) Filed: Mar. 24, 2020

(65) Prior Publication Data

US 2021/0172732 A1   Jun. 10, 2021

(30) Foreign Application Priority Data

Dec. 9, 2019   (TW) .................. 108144913

(51) Int. Cl.
*G01B 11/25* (2006.01)
*G06T 17/20* (2006.01)

(52) U.S. Cl.
CPC ...... *G01B 11/2504* (2013.01); *G01B 11/2518* (2013.01); *G06T 17/20* (2013.01); *G06T 2200/08* (2013.01); *G06T 2207/10028* (2013.01)

(58) Field of Classification Search
USPC ......... 382/154, 106; 348/136, 370; 356/610; 702/152
See application file for complete search history.

(56) References Cited

U.S. PATENT DOCUMENTS 6,754,370 B1 * 6/2004 Hall-Holt ............... G01B 11/25
                                                        356/3
6,975,361 B2 * 12/2005 Kamon ..................... G02B 7/28
                                                        356/3.01
8,976,363 B2    3/2015 Bendall et al.
(Continued)

FOREIGN PATENT DOCUMENTS

CN   102175179 A   9/2011
CN   105551039 A   5/2016
(Continued)

OTHER PUBLICATIONS

Machine translation of above reference N.*
(Continued)

*Primary Examiner* — Kathleen Y Dulaney

(57) ABSTRACT

A projecting apparatus includes a projecting device, an image-capturing device and a processing device. The projecting device projects a reversible structured light code onto a surface. The image-capturing device captures the reversible structured light code projected onto the surface and obtains image data. The processing device is coupled to the projecting device and the image-capturing device. The processing device receives the image data, generates three-dimensional point cloud information by performing decoding on the image data, and obtains scanning shift information corresponding to the projecting device according to the three-dimensional point cloud information and three-dimensional information corresponding to the surface.

18 Claims, 6 Drawing Sheets

(56) References Cited

U.S. PATENT DOCUMENTS

| | | | | |
|---|---|---|---|---|
| 2003/0042401 | A1* | 3/2003 | Gartner | G01B 11/2545 |
| | | | | 250/208.1 |
| 2007/0195285 | A1* | 8/2007 | Jaynes | G03B 37/04 |
| | | | | 353/69 |
| 2008/0285843 | A1* | 11/2008 | Lim | G06V 10/147 |
| | | | | 382/154 |
| 2009/0225333 | A1* | 9/2009 | Bendall | G06T 7/521 |
| | | | | 356/626 |
| 2010/0177319 | A1* | 7/2010 | Towers | G01B 11/2504 |
| | | | | 356/610 |
| 2014/0078260 | A1* | 3/2014 | Taubin | G06T 7/80 |
| | | | | 348/46 |
| 2015/0302570 | A1* | 10/2015 | Shirakyan | G06T 7/85 |
| | | | | 348/46 |
| 2015/0310604 | A1* | 10/2015 | Lim | G06T 7/001 |
| | | | | 382/141 |
| 2016/0006914 | A1* | 1/2016 | Neumann | G06F 3/017 |
| | | | | 348/370 |
| 2017/0180689 | A1* | 6/2017 | Morrison | H04N 9/3194 |
| 2017/0188015 | A1* | 6/2017 | Heidemann | H04N 13/239 |
| 2017/0195647 | A1 | 7/2017 | Honkanen et al. | |
| 2018/0246325 | A1 | 8/2018 | Frisken | |
| 2019/0011542 | A1* | 1/2019 | Shi | G01S 17/89 |
| 2019/0166339 | A1* | 5/2019 | De La Cruz | G06T 7/70 |
| 2019/0353767 | A1 | 11/2019 | Eberspach et al. | |
| 2019/0392598 | A1* | 12/2019 | Liu | G06T 7/521 |
| 2020/0005489 | A1* | 1/2020 | Kroeger | G06T 7/80 |
| 2020/0334895 | A1* | 10/2020 | Skotheim | G06T 5/50 |
| 2021/0225032 | A1* | 7/2021 | Hain | G06T 7/73 |
| 2021/0254968 | A1* | 8/2021 | Zhang | G01B 11/254 |
| 2022/0055652 | A1* | 2/2022 | Lee | G05D 1/02 |

FOREIGN PATENT DOCUMENTS

| | | | |
|---|---|---|---|
| CN | 105809668 | A | 7/2016 |
| CN | 105551039 | B | 12/2017 |
| CN | 107462184 | B | 1/2019 |
| CN | 110300292 | A | 10/2019 |
| CN | 107607040 | B | 1/2020 |
| DE | 102016105405 | B4 | 9/2016 |
| KR | 101853864 | B | 5/2018 |
| TW | I517101 | | 1/2016 |
| TW | 201621811 | A | 6/2016 |
| WO | WO-2017/101150 | * | 6/2017 |
| WO | WO2017101150 | A1 | 6/2017 |

OTHER PUBLICATIONS

Taiwan Patent Office, Office Action, Patent Application Serial No. 108144913, dated Aug. 14, 2020, Taiwan.

Shuang Yu, et al., "3D measurement using combined Gray code and dual frequencyphase-shifting approach," Optics Communications, Jan. 2018, pp. 283-290, Elsevier, US.

Nia, Farzad Hossein. "Development Of Micromirror-Based Laser Line Generator," Ryerson University (Degree granting institution), 2017, 47 pages, Farzad Hossein Nia, Canada.

Dongliang Zheng, et al. "Phase-shifting profilometry combined with Gray-code patterns projection: unwrapping error removal by an adaptive median filter," Optics Express, Mar. 2017, pp. 4700-4713, vol. 25, No. 5, 6, Optical Society of America, US.

China Patent Office, Office Action, Patent Applicaiton Serial No. 201911373189.8, dated May 31, 2022, China.

* cited by examiner

PROJECTING APPARATUS AND PROJECTING CALIBRATION METHOD

CROSS-REFERENCE TO RELATED APPLICATION

The present application is based on, and claims priority from, Taiwan Application Serial Number 108144913, filed Dec. 9, 2019, the disclosure of which is hereby incorporated by reference herein in its entirety.

TECHNICAL FIELD

The disclosure relates to a projecting apparatus and a projecting calibration method.

BACKGROUND

With the development of technology, structured-light 3D scanners are gradually being adopted by users. In general, the cost of a structured-light 3D scanner mainly depends on the projector that is installed in the structured-light 3D scanner. Currently, in terms of what is available on the consumer market, the projector used in a structured-light 3D scanner may be a digital light processing (DLP) projector or a micro electro mechanical systems scanning mirror (MEMS scanning mirror) projector, or something similar.

The cost of a MEMS scanning mirror projector is less than the cost of a DLP projector. However, although the cost of a MEMS scanning mirror projector is low, scanning shift of projector may occur with the digital light generated by a MEMS scanning mirror projector, deforming the projected image from the MEMS scanning mirror projector, and affecting the accuracy of the 3D point cloud that is generated. Therefore, how to effectively improve the quality of the point cloud information and decrease the cost of the hardware has become an important issue.

SUMMARY

The disclosure provides a projecting apparatus, which includes a projecting device, an image-capturing device and a processing device. The projecting device is configured to project a reversible structured light code onto a surface. The image-capturing device is configured to capture the reversible structured light code projected onto the surface and obtain image data. The processing device is coupled to the projecting device and the image-capturing device. The processing device is configured to receive the image data, generate three-dimensional point cloud information by performing decoding on the image data, and obtain scanning shift information corresponding to the projecting device according to the three-dimensional point cloud information and three-dimensional information corresponding to the surface.

In addition, the disclosure provides a projecting calibration method, which includes steps of projecting a reversible structured light code onto a surface by a projecting device; capturing the reversible structured light code projected onto the surface and obtaining image data by an image-capturing device; receiving the image data, generating three-dimensional point cloud information by performing decoding on the image data, and obtaining scanning shift information corresponding to the projecting device according to the three-dimensional point cloud information and three-dimensional information corresponding to the surface by a processing device.

DETAILED DESCRIPTION OF DISCLOSED EMBODIMENTS

Technical terms of the disclosure are based on their general definition in the technical field of the disclosure. If the disclosure describes or explains one or some terms, definition of the terms is based on the description or explanation of the disclosure. Each of the disclosed embodiments has one or more technical features. In possible implementation, a person skilled in the art would selectively implement all or some technical features of any embodiment of the disclosure or selectively combine all or some technical features of the embodiments of the disclosure.

In each of the following embodiments, the same reference number represents the same or a similar element or component.

Figure 1:
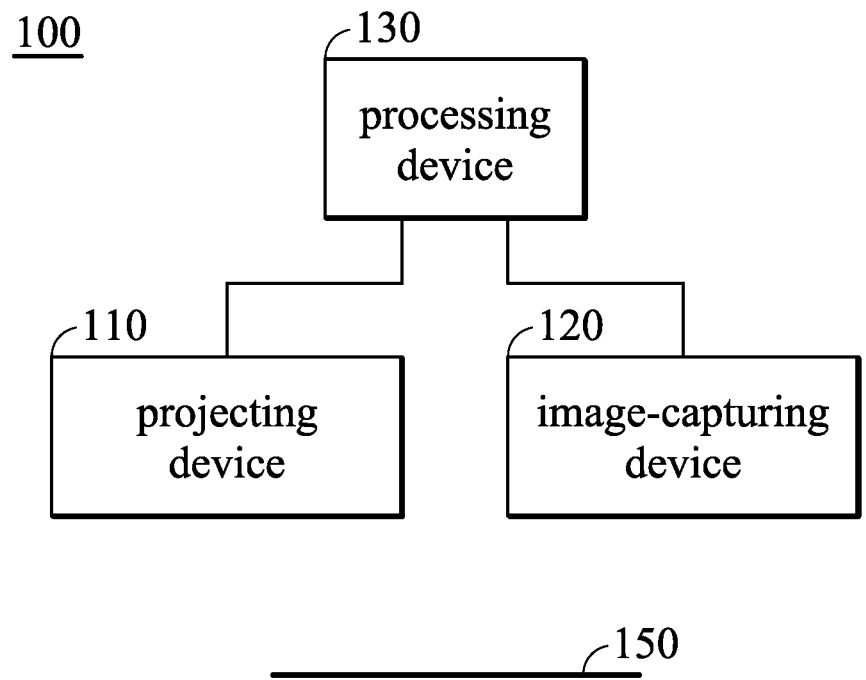
FIG. 1 is a schematic view of a projecting apparatus according to an embodiment of the disclosure.

FIG. 1 is a schematic view of a projecting apparatus 100 according to an embodiment of the disclosure. In the embodiment, the projecting apparatus 100 is suitable to a three-dimensional (3D) scanner, a mobile phone, a tablet computer, a notebook computer, etc., but the application of the disclosure is not limited thereto. Please refer to FIG. 1. The projecting apparatus 100 includes a projecting device 110, an image-capturing device 120 and a processing device 130.

Figure 2:
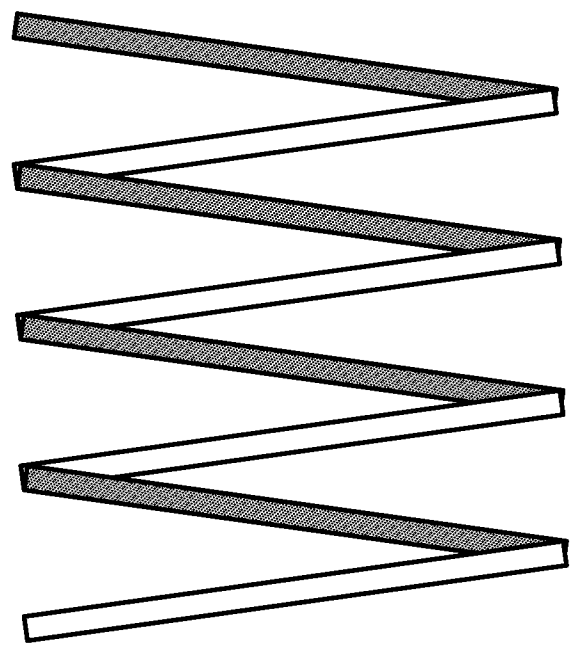
FIG. 2 is a schematic view of a projection of a reversible structured light code according to an embodiment of the disclosure.

The projecting device 110 configured to project a reversible structured light code onto a surface 150. In the embodiment, the projecting device 110 is, for example, a micro electro mechanical systems mirror (MEMS mirror) projector. In addition, the reversible structured light code is, for example, a gray stripe light code. That is, the reversible structured light code is encoded by using the gray code, and the reversible structured light code after projecting is presented as shown in FIG. 2, but the embodiment of the disclosure is not limited thereto. The reversible structured light code may be encoded by using other manners, such as a binary-coded decimal (BCD) code, an excess 3-BCD code, etc., and the same effect may be achieved. It should be noted that FIG. 2 shows a projecting result when the projecting device 110 is not calibrated.

Furthermore, in one embodiment, the reversible structured light includes, for example, obtaining three-dimensional (3D) depth information through structured light coding information. In another embodiment, the reversible structured light coding information may also be obtained by reversing the 3D depth information back to the structured light spot.

In some embodiments, the above surface 150 is, for example, a surface of a standard part, wherein the standard part may be a physical object, such as an accessory with particular specification, or an existing object, such as a table, a screen, a block gauge, etc. In addition, a size of the standard part is known, for example. In some embodiments, the above surface 150 may also be a surface of a ground or a wall. In addition, a size or a range of the reversible structured light code projected onto the surface of the ground or the wall is known, for example.

The image-capturing device 120 is configured to capture the reversible structured light code projected onto the surface 150 and obtain image data. The image data obtained by the image-capturing device 120 is, for example, two-dimensional (2D) image data. In the exemplary embodiment, image-capturing device 120 is, for example, a charge coupled device (CCD) or other cameras with image capturing function.

The processing device 130 is coupled to the projecting device 110 and the image-capturing device 120. The processing device 130 is configured to receive the image data, generate three-dimensional point cloud information by performing decoding on the image data. Furthermore, for example, the processing device 130 computes the image data according to a stereo vision triangulation method to obtain a depth message corresponding to the surface 150 and then generate the three-dimensional point cloud information corresponding to the image data. Then, the processing device 130 obtains scanning shift information corresponding to the projecting device 110 by performing computation according to the three-dimensional point cloud information and the three-dimensional information corresponding to the surface 150. Therefore, the embodiment of the disclosure may effectively obtain the scanning shift information corresponding to the projecting device 110, so as to further calibrate the projecting device 110 and improve the quality of the point cloud information.

In some embodiments, the user may store the three-dimensional information corresponding to the surface 150 in a storage device (not shown) of the projecting apparatus 100 in advance, such as a memory or a hard disk. In some embodiments, the user may also use the image-capturing device 120 to capture the image of the surface 150 and obtain the image data corresponding to the surface 150.

Then, the processing device 130 may process the image data to obtain the three-dimensional information corresponding to the surface 150 and store the three-dimensional information corresponding to the surface 150 in a storage device of the (not shown) of the projecting apparatus 100. In the embodiment, the three-dimensional information corresponding to the surface 150 includes, for example, three-dimensional coordinate information of each position of the surface 150. Specifically, the three-dimensional information corresponding to the surface 150 may include a value of X-axis, a value of Y-axis and a value of Z-axis of each position on the surface 150.

Furthermore, after the processing device 130 receives the image data generated by the image-capturing device 120, the processing device 130 may decode the image data. That is, the processing device 130 may use the decoding manner of the gray code and the stereo vision triangulation method to decode the reversible structured light code in the image data, so as to generate the three-dimensional point cloud information. In addition, the three-dimensional point cloud information may include three-dimensional coordinate information of a plurality of pixels in the image data, i.e., a value of X-axis, a value of Y-axis and a value of Z-axis corresponding to each pixel in the image data.

In addition, the processing device 130 may also obtain the three-dimensional information of the surface 150. For example, the processing device 130 obtains the three-dimensional information of the surface 150 from the storage device (not shown) of the projecting device 110, i.e., the coordinate (such as the value of X-axis, the value of Y-axis and the value of Z-axis) corresponding to each position of the surface 150. The supplemental description is that the image-capturing device 120 may capture the image of a part of region of the surface 150. In this case, the image data only includes the part of the region corresponding to the surface 150. Accordingly, the processing device 130 may obtain the coordinates in the range of the region according to the range of the region corresponding to the surface 150 included in the image data. That is, a part of the three-dimensional information of the surface 150 is only obtained according to the computing requirements.

Then, the processing device 130 may obtain depth error information according to the three-dimensional point cloud information and the three-dimensional information of the surface 150. For example, the processing device 130 may subtract the three-dimensional information of the surface 150 from the three-dimensional point cloud information to obtain the depth error information. Specifically, the depth error information is a difference between a value of Z-axis of the three-dimensional point cloud information and a value of Z-axis of the three-dimensional information corresponding to the surface 150.

In the embodiment, the depth error information may be computed based on the following equation (1):

$$\Delta Z_{(x,y)} = Z_{A(x,y)} - Z_{R(x,y)}, \tag{1}$$

wherein (x,y) indicates a two-dimensional coordinate on the surface 150, $\Delta Z_{(x,y)}$ is the depth error information, $Z_{A(x,y)}$ is the three-dimensional point cloud information, $Z_{R(x,y)}$ is the three-dimensional information of the surface 150. In the embodiment, the processing device 130 may subtract the value of Z-axis of the three-dimensional information of the point (x,y) on the surface 150 from the value of Z-axis of the three-dimensional point cloud information corresponding to the point (x,y) on the surface 150 based on equation (1). That is, the processing device 130 computes the three-dimensional point cloud information (i.e., $Z_{A(x,y)}$) of the pixel points corresponding to the region of the coordinate (x,y) on the surface 150 and the value (i.e., $Z_{R(x,y)}$) of Z-axis of the three-dimensional information of the coordinate (x,y) on the surface 150, so as to obtain the depth error information (i.e., $\Delta Z_{(x,y)}$) corresponding to each pixel point.

Then, the processing device 130 may obtain projecting error information according to the depth error information, the three-dimensional point cloud information and a plurality of pieces of compensation depth information. Furthermore, the processing device 130 may obtain a pixel shift quantity corresponding to each pixel point according to the depth error information, the three-dimensional point cloud information and the pieces of compensation depth information. Specifically, the compensation depth information is a depth value of the coordinate point of the projecting coordinate of the projecting device 110 compensated by using the pixel shift quantity, and the pixel shift quantity is a pixel compensation quantity of the compensation depth information. Then, the processing device 130 computes the a plurality of compensation depth differences between the pieces of compensation depth information and the three-dimensional point cloud information, and minimizes the differences between the compensation depth differences and the depth error information to obtain the best pixel shift quantity. That is, the processing device 130 selects one of the pixel shift quantities corresponding to a smallest difference of the differences between the depth error information and the compensation depth differences.

Figure 3:
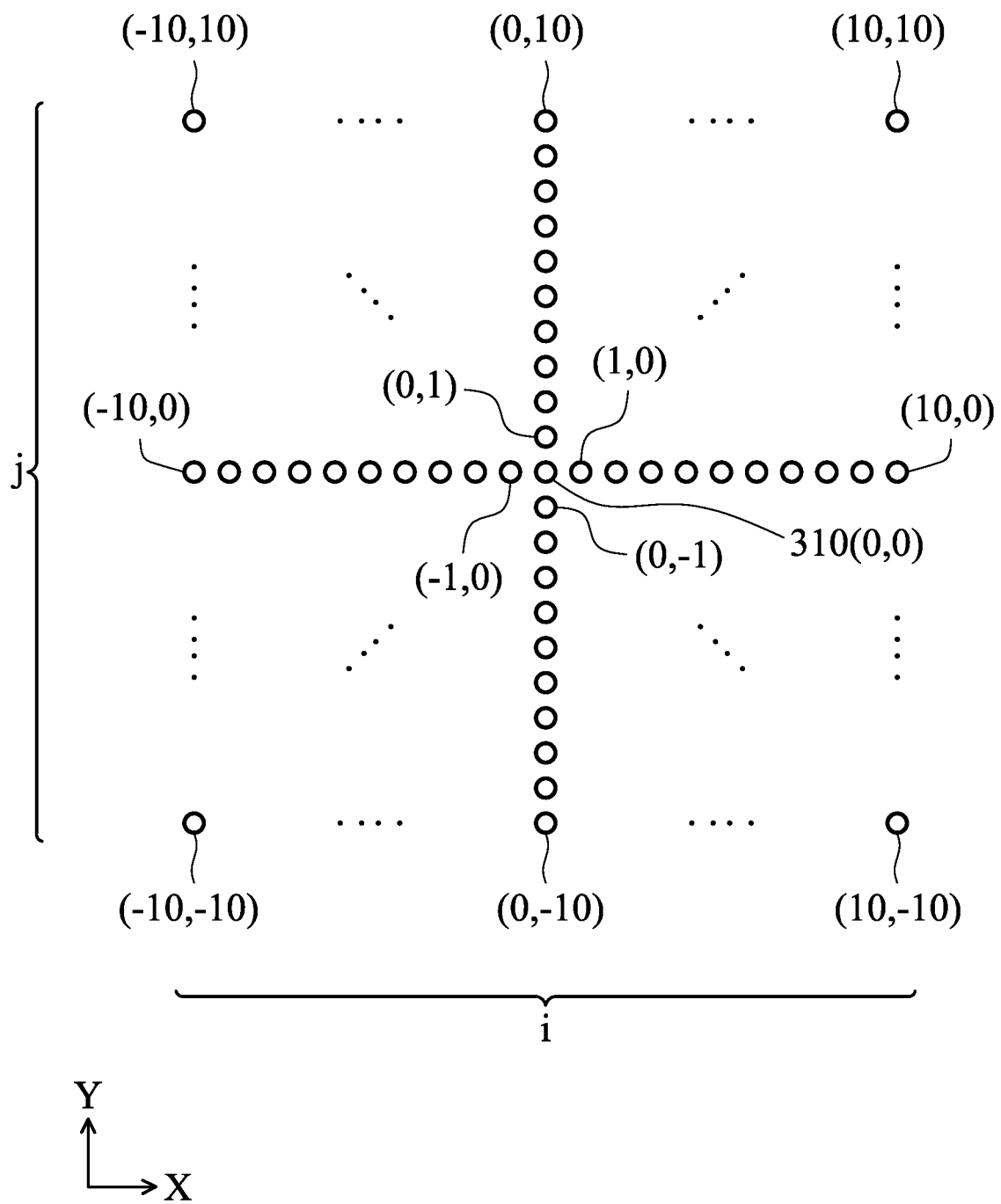
FIG. 3 is a schematic view of a corresponding relationship of a pixel point and a plurality of pixel shift quantities according to an embodiment of the disclosure.

In the embodiment, an algorithm for determining the pixel shift quantity of each pixel point is, for example, equation (2):

$$\min_{\substack{-10 \leq i \leq 10 \\ -10 \leq j \leq 10}} |\Delta Z_{(x,y)} - (P(C_{(x,y)}, G_{(x_C,y_C)}) - P(C_{(x,y)}, G_{(x_C,y_C)} + (i, j)))|, \quad (2)$$

wherein $C_{(x,y)}$ is an image coordinate corresponding to the image-capturing device 120, $G_{(x_C,y_C)}$ is an image coordinate corresponding to the projecting device 110, $P(C_{(x,y)}, G_{(x_C,y_C)})=Z_{A(x,y)}$ is the depth value of the three-dimensional point cloud information, $P(C_{(x,y)}, G_{(x_C,y_C)}+(i,j))$ is the compensation depth information, (i,j) is the pixel shift quantity of the projecting device 110 in the X-axis direction and the Y-axis direction on the projecting coordinate (as shown in FIG. 3), $P(C_{(x,y)}, G_{(x_C,y_C)})-P(C_{(x,y)}, G_{(x_C,y_C)}+(i,j))$ is the compensation depth difference, (x,y) is the point coordinate on the surface 150, $(x_C, y_C)$ is the point coordinate of the image data obtained by the image-capturing device 120 (i.e., through $C_{(x,y)}$ transforming), $G_{(x_C,y_C)}$ transforms the point coordinate (i.e., $(x_C, y_C)$) of the image data obtained by the image-capturing device 120 into the data coordinate projected by the projecting device 110, and P(*) is an operator and obtains the three-dimensional coordinate information by performing computation according to the two-dimensional coordinate data.

For example, assume the coordinate (1,1) on the surface 150 is taken as an example, i.e., the coordinate (x,y)=(1,1), and the coordinate point (x,y)=(1,1) of the surface 150 is expressed as the coordinate $(x_c, y_c)=(1,1)$ through the coordinate point corresponding to the image data captured by the image-capturing device 120 from the surface 150, and then the coordinate point $(x_c, y_c)$ of the image-capturing device 120 is transformed into the coordinate point $G_{(x_C,y_C)}$ of the projecting device 110. In the embodiment, the pixel point 310 of $G_{(x_C,y_C)}=(1,1)$ is taken as an example, i.e., the pixel point 310 corresponding to the coordinate $G_{(x_C,y_C)}=(1,1)$. Then, the processing device 130 generates the coordinates of 441 shifted pixel points according to the pixel point of the coordinate $G_{(x_C,y_C)}=(1,1)$ corresponding to the projecting device 110 and 441 pixel shift quantities (i,j). That is, the coordinates of 441 shifted pixel points are that the pixel point of the coordinate $G_{(x_C,y_C)}=(1,1)$ shift the coordinates of the pixel points of (1,0), (2,0) . . . , (10,0), (0,1), (0,2) . . . , (0,10), . . . (10,10), (−1,0), . . . (−10,0), . . . , (−10,10), (0, −1), . . . , (0, −10), . . . , (−10, −10), . . . , (10, −10), i.e., $G_{(x_C,y_C)}+(i,j)$, as shown in FIG. 3. In addition, since the pixel point 310 is a base point, the pixel point 310 shifts the coordinate of the pixel point of (0,0).

Then, since $\Delta Z_{(1,1)}$ is obtained and $P(C_{(1,1)}, G_{(1,1)})$ is known, the processing device 130 may perform the computation based on equation (2) to select one of the above 441 pixel shift quantities that may minimize the value of the equation corresponding to the coordinate (1,1). The pixel shift quantity (i,j)=(0,5) is taken as an example. That is, when the pixel shift quantity is (0,5), the value of equation (2) corresponding to (x,y)=(1,1) is the minimum value. The pixel shift quantity (0,5) is determined as the pixel shift quantity of the pixel point of the projecting coordinate=(1,1) of the projecting device 110. The computation manner of the pixel shift quantities corresponding to the pixel points of the rest of coordinate are the same as the description of the above embodiment, and the description thereof is not repeated herein.

In equation (2), the setting of −10≤i≤10 and −10≤j≤10 is only one exemplary embodiment of the embodiments of the disclosure, but the embodiment of the disclosure is not limited thereto. The user may adjust the ranges of i and j of equation (2) according to the requirements thereof, and the same effect may be achieved. For example, −5≤i≤5 and −5≤j≤5, −3≤i≤3 and −3≤j≤3, −6≤i≤6 and −6≤j≤6, −8≤i≤8 and −8≤j≤8, etc. The rest of ranges of i and j are similar. In addition, the embodiment of the adjusted ranges of i and j are the same as the description of the above embodiment, and the description thereof is not repeated herein.

Furthermore, in the embodiment, for example, $P(C_{(x,y)}, G_{(x_C,y_C)})$ may be computed based on the following equation (3):

$$P(C_{(x,y)}, G_{(x_C,y_C)}) = L_0 + \left( \frac{\text{Normal Vector} \cdot (P_0 - L_0)}{\text{Normal Vector} \cdot L} \right) \times L, \quad (3)$$

wherein $C_{(x,y)}$ is the coordinate corresponding to the image-capturing device 120, $G_{(x_C,y_C)}$ is the coordinate corresponding to the projecting device 110, Normal Vector=the coordinate vector of X-axis of the projecting device 110×$V_P$, $$V_P = \left( 0, \frac{b_y + Y\text{-axis of the mirror center of the projecting device } 110}{\text{the focal length of the projecting device } 110}, 1 \right),$$

$L_O$ is the center coordinate of the image data corresponding to the image-capturing device 120, and $L=V_C-L_O$ is defined, $$V_C = \left( \frac{a_x + X\text{-axis of the mirror center of the image-capturing device } 120}{\text{the focal length of the image-capturing device } 120}, \frac{a_y + Y\text{-axis of the mirror center of the image-capturing device } 120}{\text{the focal length of the image-capturing device } 120}, 1 \right),$$

$P_0$ is a center coordinate of the projecting device 110.

Then, the processing device 130 may compute the pixel shift quantity of each pixel point coordinate $G_{(x_C,y_C)}$ corresponding to the projecting device 110 (such as the pixel point quantity (0,5) of the pixel point of $G_{(x_C,y_C)}=(1,1)$) and a transforming ratio to compute the projecting error information. In the embodiment, for example, the projecting error information may be computed based on the following equation (4):

$$\Delta d_{(x,y)} = (i,j) \times Pd, \quad (4)$$

wherein $\Delta d_{(x,y)}$ is the projecting error information, (i,j) are the pixel shift quantities, Pd is a transforming ratio between a pixel and a length (for example, a pixel is transformed into a corresponding centimeter, and the unit is cm/pixel). Specifically, the projecting error information is the difference between the X-axis direction and the Y-axis direction of the reversible structured light code actually projected by the projecting device 110 and the ideal reversible structured light code.

After the processing device 130 obtains the projecting error information, the processing device 130 may obtain the scanning shift information corresponding to the projecting device 110 by performing computation according to the projecting error information and a projection distance. In the embodiment, for example, the scanning shift information corresponding to the projecting device 110 may be computed based on the following equation (5):

$$\theta_{(x,y)} = \tan^{-1}\frac{\Delta d_{(x,y)}}{h}, \quad (5)$$

wherein $\theta_{(x,y)}$ is the scanning shift information, $d_{(x,y)}$ is the projecting error information, and h is the projection distance (such as a distance between the projecting device 110 and the surface 150). In addition, in some embodiments, the projection distance may be stored in the storage device of the projecting apparatus 100 in advance.

In some embodiments, the projecting apparatus 100 may be configured with a distance measurement device. Before computing the scanning shift information corresponding to the projecting device 110, the projecting apparatus 100 may measures the distance between the projecting device 110 and the surface 150 through the distance measurement device, so as to generate distance measurement information. The distance measurement information is transmitted to the processing device 130, such that the processing device 130 obtains the projection distance corresponding to the distance measurement information, and stores the projection distance in the storage device of the projecting apparatus 100.

Furthermore, after the processing device 130 obtains the scanning shift information corresponding to the projecting device 110, the processing device 130 may calibrate the projecting device 110 according to the above scanning shift information, such that the reversible structured light code projected by the projecting device 110 is more accurate. Therefore, the scanning shift quantity of the projecting device 110 is decreased and the quality of the three-dimensional point cloud information is increased.

Figure 4:
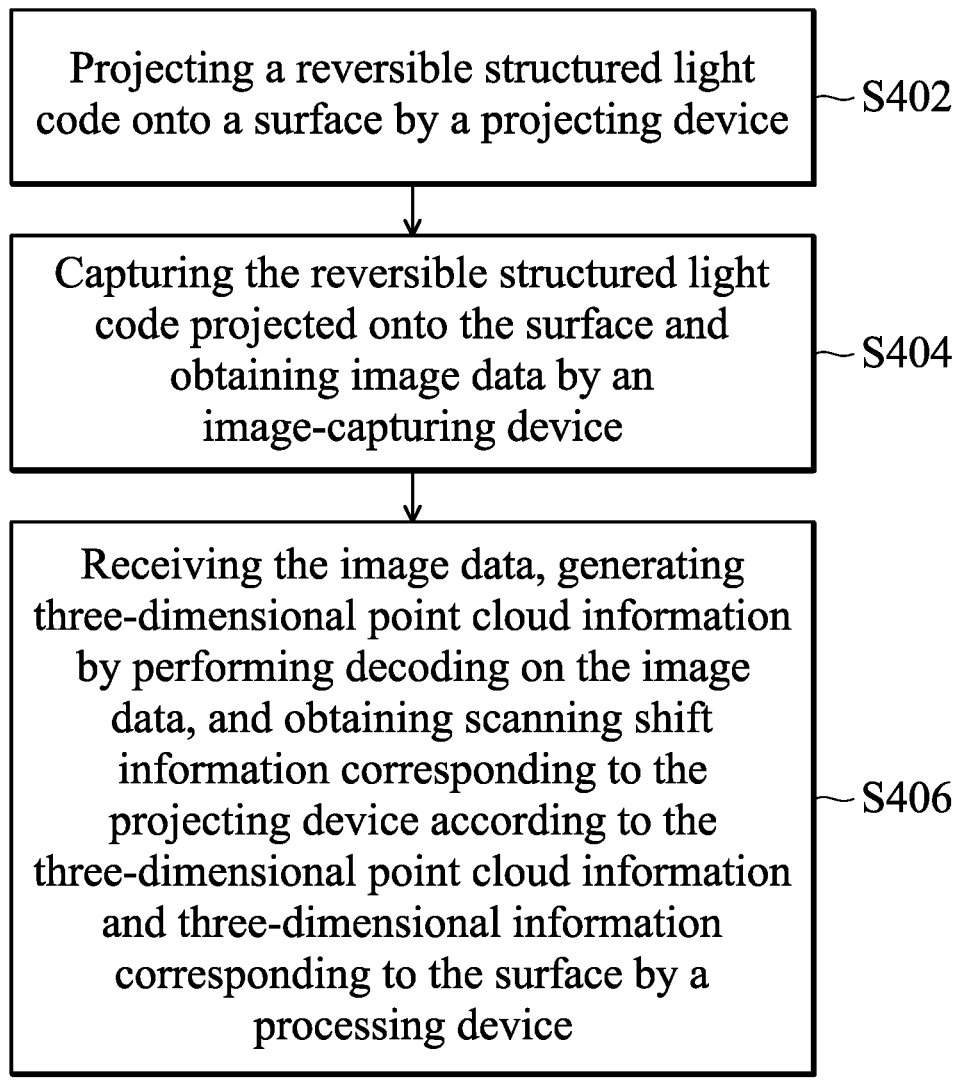
FIG. 4 is a flowchart of a projecting calibration method of a projecting apparatus according to an embodiment of the disclosure.

FIG. 4 is a flowchart of a projecting calibration method of a projecting apparatus according to an embodiment of the disclosure. In step S402, the method involves projecting a reversible structured light code onto a surface by a projecting device. In step S404, the method involves capturing the reversible structured light code projected onto the surface and obtaining image data by an image-capturing device. In step S406, the method involves receiving the image data, generating three-dimensional point cloud information by performing decoding on the image data, and obtaining scanning shift information corresponding to the projecting device according to the three-dimensional point cloud information and three-dimensional information corresponding to the surface by a processing device.

In the embodiment, the above reversible structured light code is a gray stripe light code. In addition, the above projecting device is a micro electro mechanical systems scanning mirror projector. Furthermore, the above surface is a surface of a standard part. Moreover, the scanning shift information is computed based on equation (5).

Figure 5:
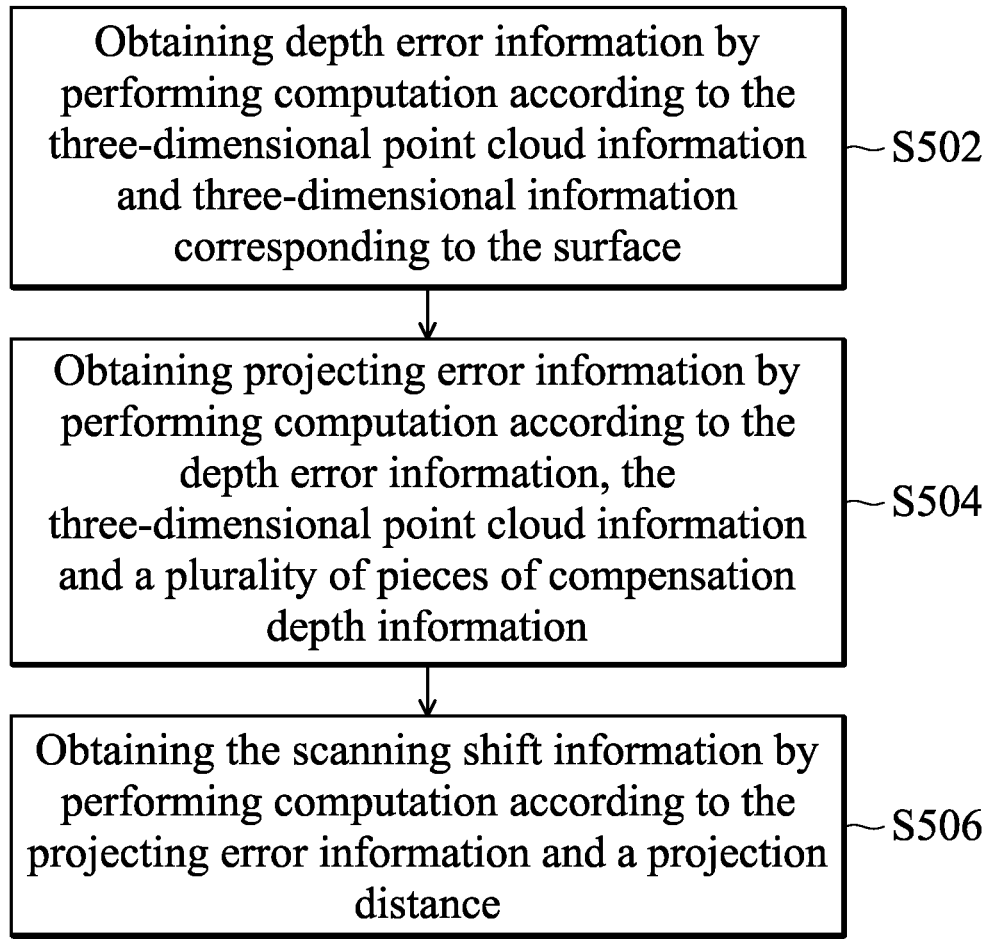
FIG. 5 is a detailed flowchart of step S406 in FIG. 4.

FIG. 5 is a detailed flowchart of step S406 in FIG. 4. In step S502, the method involves obtaining depth error information by performing computation according to the three-dimensional point cloud information and three-dimensional information corresponding to the surface. In step S504, the method involves obtaining projecting error information by performing computation according to the depth error information, the three-dimensional point cloud information and a plurality of pieces of compensation depth information. In step S506, the method involves obtaining the scanning shift information by performing computation according to the projecting error information and a projection distance. In the embodiment, the scanning shift information is computed based on equation (5).

Figure 6:
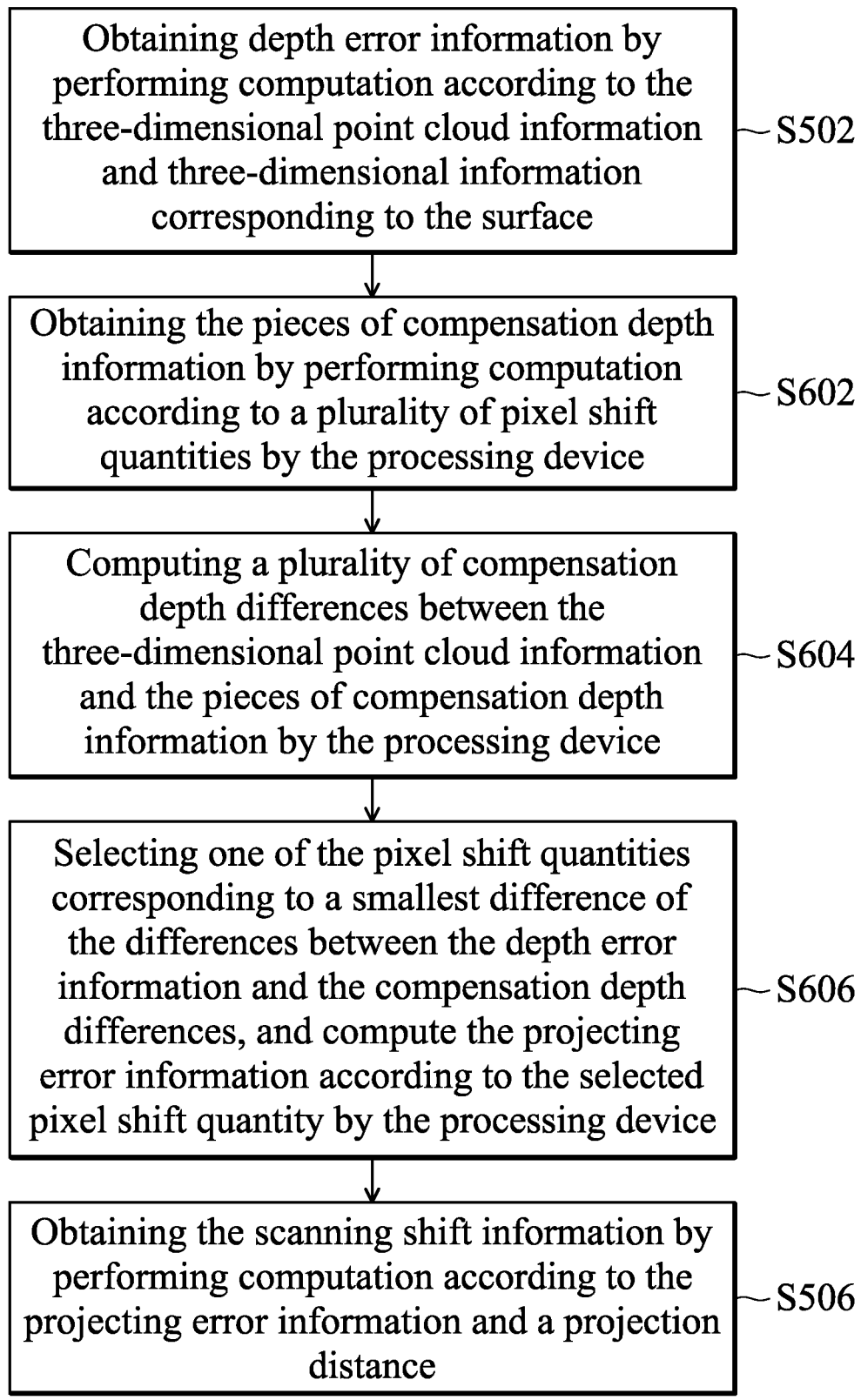
FIG. 6 is another detailed flowchart of step S406 in FIG. 4.

FIG. 6 is another detailed flowchart of step S406 in FIG. 4. In the embodiment, steps S502 and S506 in FIG. 6 are the same as steps S502 and S506 in FIG. 5. Accordingly, steps S502 and S506 in FIG. 6 are the same as the description of the embodiment of FIG. 5, and the description thereof is not repeated herein. In step S602, the method involves obtaining the pieces of compensation depth information by performing computation according to a plurality of pixel shift quantities by the processing device. In step S604, the method involves computing a plurality of compensation depth differences between the three-dimensional point cloud information and the pieces of compensation depth information by the processing device. In step S606, the method involves selecting one of the pixel shift quantities corresponding to a smallest difference of the differences between the depth error information and the compensation depth differences, and compute the projecting error information according to the selected pixel shift quantity by the processing device. In the embodiment, the projecting error information is computed based on equation (4), and the scanning shift information is computed based on equation (5).

Figure 7:
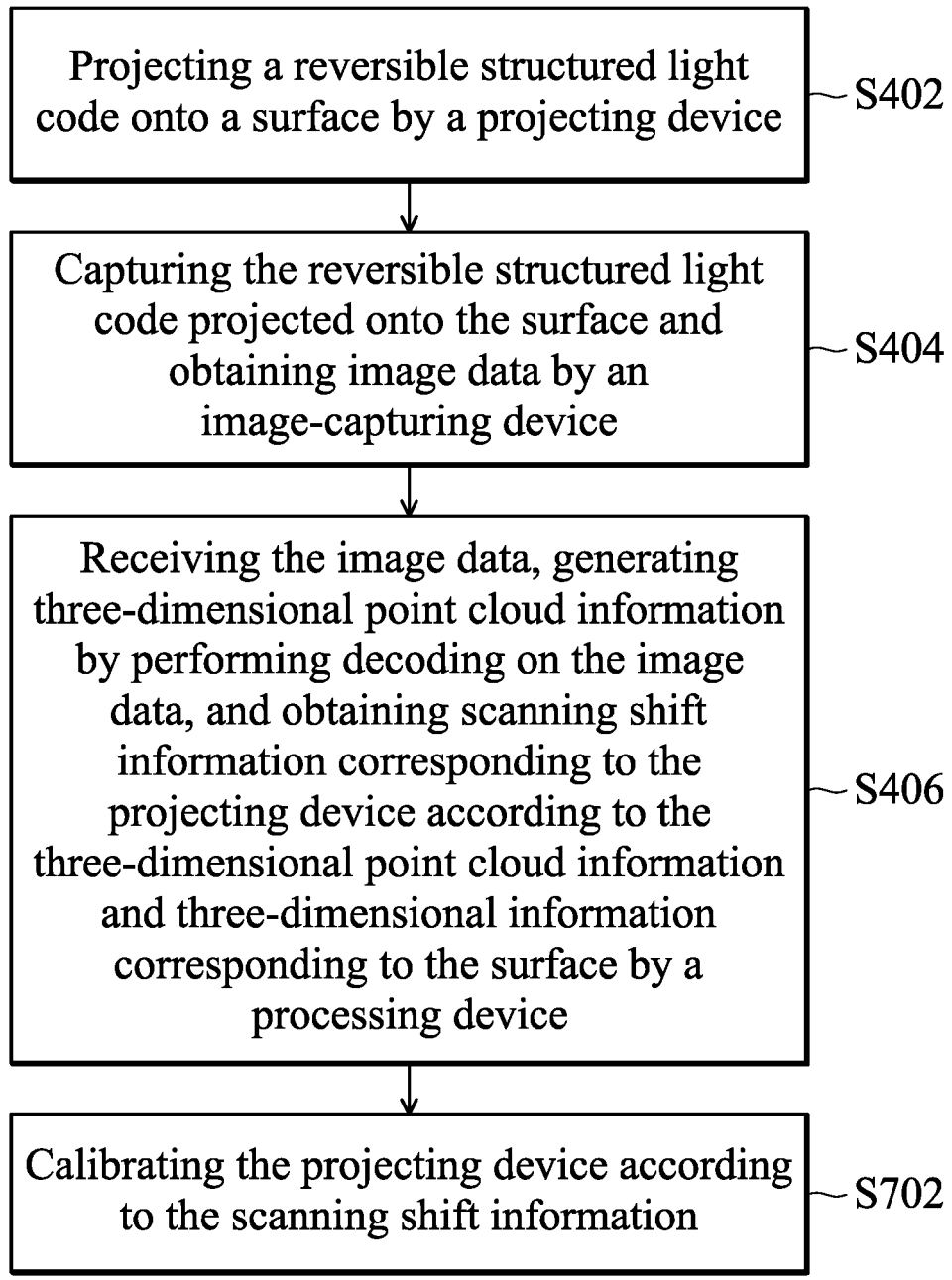
FIG. 7 is a flowchart of a projecting calibration method of a projecting apparatus according to another embodiment of the disclosure.

FIG. 7 is a flowchart of a projecting calibration method of a projecting apparatus according to another embodiment of the disclosure. In the embodiment, steps S402~S406 in FIG. 7 are the same as steps S402~S406 in FIG. 4. Accordingly, steps S402~S406 in FIG. 7 are the same as the description of the embodiment of FIG. 4, and the description thereof is not repeated herein.

In step S702, the method involves calibrating the projecting device according to the scanning shift information. In the embodiment, the above reversible structured light code is a gray stripe light code. In addition, the above projecting device is a micro electro mechanical systems scanning mirror projector. Furthermore, the above surface is a surface of a standard part. Moreover, the scanning shift information is computed based on equation (5).

In summary, according to the projecting apparatus and the projecting calibration method disclosed by the disclosure, the projecting device is used to project the reversible structured light code onto the surface. The image-capturing device is used to capture the reversible structured light code projected onto the surface and obtain the image data. The processing device is used to receive the image data, generate three-dimensional point cloud information by performing decoding on the image data, and obtain scanning shift information corresponding to the projecting device according to the three-dimensional point cloud information and three-dimensional information corresponding to the surface Therefore, the scanning shift quantity corresponding to the projecting device may be effectively obtained, the quality of the point cloud information is improved and the cost of hardware is decreased.

In addition, the processing device of the embodiment of the disclosure may further calibrate the projecting device according to the scanning shift information, such that the reversible structured light code projected by the projecting device is more accurate. Therefore, the quality of the three-dimensional point cloud information is increased and the cost of the entire hardware is decreased while considering the quality of the point cloud information.

The supplemental description is that in some embodiments, the processing device may be one or more single-core processors or multi-core processors combined with the memory, and be driven through software/hardware to operate.

While the disclosure has been described by way of example and in terms of the embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A projecting apparatus, comprising:
a projecting device, configured to project a reversible structured light code onto a surface;
an image-capturing device, configured to capture the reversible structured light code projected onto the surface and obtain image data; and
a processing device, coupled to the projecting device and the image-capturing device, and configured to receive the image data, generate three-dimensional point cloud information by performing decoding on the image data, and obtain scanning shift information corresponding to the projecting device according to the three-dimensional point cloud information, three-dimensional information corresponding to the surface, a plurality of pieces of compensation depth information, and a projection distance;
wherein the processing device is further configured to obtain depth error information by performing computation according to the three-dimensional point cloud information and three-dimensional information corresponding to the surface, obtain projecting error information by performing computation according to the depth error information, the three-dimensional point cloud information and the plurality of pieces of compensation depth information, and obtain the scanning shift information by performing computation according to the projecting error information and the projection distance.

2. The projecting apparatus as claimed in claim 1, wherein the scanning shift information is computed based on the following equation:

$$\theta_{(x,y)} = \tan^{-1} \frac{d_{(x,y)}}{h},$$

wherein $\theta_{(x,y)}$ is the scanning shift information, $d_{(x,y)}$ is the projecting error information, and h is the projection distance.

3. The projecting apparatus as claimed in claim 1, wherein the processing device is further configured to obtain the pieces of compensation depth information by performing computation according to a plurality of pixel shift quantities.

4. The projecting apparatus as claimed in claim 3, wherein the processing device is further configured to compute a plurality of compensation depth differences between the three-dimensional point cloud information and the pieces of compensation depth information, select one of the pixel shift quantities corresponding to a smallest difference of differences between the depth error information and the compensation depth differences, and compute the projecting error information according to the selected pixel shift quantity.

5. The projecting apparatus as claimed in claim 4, wherein the projecting error information is computed based on the following equation:

$$\Delta d_{(x,y)} = (i,j) \times Pd,$$

wherein $\Delta d_{(x,y)}$ is the projecting error information, (i,j) are the pixel shift quantities, and Pd is a transformation ratio between a pixel and a length.

6. The projecting apparatus as claimed in claim 1, wherein the reversible structured light code is a gray stripe light code.

7. The projecting apparatus as claimed in claim 1, wherein the projecting device is a micro electro mechanical systems scanning mirror projector.

8. The projecting apparatus as claimed in claim 1, wherein the surface is a surface of a standard part.

9. The projecting apparatus as claimed in claim 1, wherein the processing device further calibrates the projecting device according to the scanning shift information.

10. A projecting calibration method, comprising:
projecting a reversible structured light code onto a surface by a projecting device;
capturing the reversible structured light code projected onto the surface and obtaining image data by an image-capturing device; and
receiving the image data, generating three-dimensional point cloud information by performing decoding on the image data, and obtaining scanning shift information corresponding to the projecting device according to the three-dimensional point cloud information, three-dimensional information corresponding to the surface, a plurality of pieces of compensation depth information, and a projection distance by a processing device;
wherein the step of receiving the image data, generating the three-dimensional point cloud information by performing decoding on the image data, and obtaining the scanning shift information corresponding to the projecting device according to the three-dimensional point cloud information and three-dimensional information corresponding to the surface by the processing device further comprises:
obtaining depth error information by performing computation according to the three-dimensional point cloud information and three-dimensional information corresponding to the surface;
obtaining projecting error information by performing computation according to the depth error information, the three-dimensional point cloud information and the plurality of pieces of compensation depth information; and
obtaining the scanning shift information by performing computation according to the projecting error information and the projection distance.

11. The projecting calibration method as claimed in claim 10, wherein the scanning shift information is computed based on the following equation:

$$\theta_{(x,y)} = \tan^{-1} \frac{d_{(x,y)}}{h}$$

wherein $\theta_{(x,y)}$ is the scanning shift information, $d_{(x,y)}$ is the projecting error information, and h is the projection distance.

12. The projecting calibration method as claimed in claim 10, wherein the step of receiving the image data, generating the three-dimensional point cloud information by performing decoding on the image data, and obtaining the scanning shift information corresponding to the projecting device according to the three-dimensional point cloud information and three-dimensional information corresponding to the surface by the processing device further comprises:
   obtaining the pieces of compensation depth information by performing computation according to a plurality of pixel shift quantities by the processing device.

13. The projecting calibration method as claimed in claim 12, wherein the step of obtaining projecting error information by performing computation according to the depth error information, the three-dimensional point cloud information and the pieces of compensation depth information comprises:
   computing a plurality of compensation depth differences between the three-dimensional point cloud information and the pieces of compensation depth information by the processing device; and
   selecting one of the pixel shift quantities corresponding to a smallest difference of differences between the depth error information and the compensation depth differences by the processing device, and computing the projecting error information according to the selected pixel shift quantity by the processing device.

14. The projecting calibration method as claimed in claim 13, wherein the projecting error information is computed based on the following equation:

$$\Delta d_{(x,y)} = (i,j) \times Pd,$$

wherein $\Delta d_{(x,y)}$ is the projecting error information, $(i,j)$ are the pixel shift quantities, and Pd is a transformation ratio between a pixel and a length.

15. The projecting calibration method as claimed in claim 10, wherein the reversible structured light code is a gray stripe light code.

16. The projecting calibration method as claimed in claim 10, wherein the projecting device is a micro electro mechanical systems scanning mirror projector.

17. The projecting calibration method as claimed in claim 10, wherein the surface is a surface of a standard part.

18. The projecting calibration method as claimed in claim 10, further comprising:
   calibrating the projecting device according to the scanning shift information.

* * * * *